United States Patent [19]

Edstrand et al.

[11] Patent Number: 5,895,763
[45] Date of Patent: Apr. 20, 1999

[54] CONTROLLED CARBONATE REMOVAL FROM WATER CONDUIT SYSTEMS

[75] Inventors: Craig Edstrand; Edward Fyfe, both of Phoenix; Jerome H. Ludwig, Paradise Valley; Myron Shenkiryk; Dan Temple, both of Phoenix, all of Ariz.

[73] Assignee: H.E.R.C. Products Incorporated, Phoenix, Ariz.

[21] Appl. No.: 08/838,174

[22] Filed: Apr. 16, 1997

[51] Int. Cl.⁶ .............. G01N 35/00; C23G 1/02; B08B 9/03; B08B 3/00

[52] U.S. Cl. .............. 436/55; 134/3; 134/22.1; 134/22.11; 134/22.14; 134/22.18; 134/22.19; 134/28; 134/41

[58] Field of Search .............. 436/55; 134/3, 134/22.1, 22.11, 22.12, 22.14, 22.18, 2.19, 27, 28, 41

[56] References Cited

U.S. PATENT DOCUMENTS

| | | | |
|---|---|---|---|
| 2,758,970 | 8/1956 | Saukaitis et al. | 252/8.55 |
| 2,807,585 | 9/1957 | Gardner et al. | 252/146 |
| 2,941,949 | 6/1960 | Saukaitis | 252/151 |
| 3,077,454 | 2/1963 | Monroe et al. | 252/148 |
| 3,607,781 | 9/1971 | Kaneko et al. | 252/389 |
| 3,688,137 | 8/1972 | Filhol | 310/43 |
| 3,885,913 | 5/1975 | Redmore et al. | 21/2.7 |
| 4,025,359 | 5/1977 | Connelly, Jr. | 134/3 |
| 4,063,317 | 12/1977 | Santore | 4/255 |
| 4,075,120 | 2/1978 | Martucci | 134/3 X |
| 4,089,795 | 5/1978 | Bailey et al. | 252/135 |
| 4,199,469 | 4/1980 | Walzer | 252/146 |
| 4,310,435 | 1/1982 | Frenier | 252/180 |
| 4,333,773 | 6/1982 | Fjällström | 134/22 C |
| 4,439,339 | 3/1984 | Doumit | 134/3 X |
| 4,477,287 | 10/1984 | Kush et al. | 134/15 |
| 4,541,945 | 9/1985 | Anderson et al. | 252/149 |
| 4,554,090 | 11/1985 | Jones | 252/181 |
| 4,587,030 | 5/1986 | Casey | 252/92 |
| 4,614,600 | 9/1986 | Schilling et al. | 252/8.553 |
| 4,637,899 | 1/1987 | Kennedy, Jr. | 252/542 |
| 4,670,189 | 6/1987 | Tomibe et al. | 252/514 |
| 4,692,252 | 9/1987 | Atwood et al. | 210/761 |
| 4,780,150 | 10/1988 | Anderson et al. | 134/3 |
| 4,851,149 | 7/1989 | Carandang | 252/147 |
| 4,993,442 | 2/1991 | Young | 134/22.14 |
| 5,011,539 | 4/1991 | Matsuda et al. | 134/22.14 |
| 5,013,366 | 5/1991 | Jackson et al. | 134/1 |
| 5,021,096 | 6/1991 | Abadi | 134/22.14 |
| 5,094,757 | 3/1992 | Light | 210/712 |
| 5,346,626 | 9/1994 | Momozaki et al. | 210/701 |
| 5,360,488 | 11/1994 | Hieatt et al. | 134/22.11 |
| 5,527,395 | 6/1996 | Perry et al. | 134/3 |

FOREIGN PATENT DOCUMENTS

| | | | |
|---|---|---|---|
| 155333 | 6/1982 | German Dem. Rep. | 134/22.14 |
| 60-150899 | 8/1985 | Japan . | |

OTHER PUBLICATIONS

L.S. Foshko et al, *Teploenergetika* 1969, 16, 31–34.

A.I. Glazyrin et al, *Energetik* 1971, 10.

V.I. Maksin et al, *Soviet J. Water Chem. Tecnol.* 1989, 11, 74–81.

*Primary Examiner*—Arlen Soderquist
*Attorney, Agent, or Firm*—Wood, Herron & Evans, L.L.P.

[57] ABSTRACT

A method for controlled removal of carbonate blockage from interior walls of water conduit systems having substantial reduction in flow capacity. A section of the system to be cleaned is isolated and an aqueous liquid is circulated to establish baseline liquid flow rates. An acidic cleaning composition which removes the blockage but which generates carbon dioxide gas is then added under controlled conditions to a circulating aqueous cleaning solution. The fluid flow rates and pH are monitored throughout treatment. Adjustments are made if necessary to maintain a controlled amount of carbon dioxide gas liberated. The aqueous acid cleaning solution is circulated in an open loop system with continued addition of acid until the outflow rate decreases and once again equals the inflow rate. Substantial inorganic carbonate deposits are thus removed from water conduit systems while dangerous conditions due to excessive generation of carbon dioxide gas are avoided.

14 Claims, No Drawings

CONTROLLED CARBONATE REMOVAL FROM WATER CONDUIT SYSTEMS

BACKGROUND OF THE INVENTION

Various water conduit systems exist wherein a buildup of substantial carbonate deposits on the interior surfaces of the components eventually requires cleaning or replacement of the system. Carbonate blockage usually occurs when water hardness in the system exceeds the solubility of the carbonate salts present in the water. This may happen when water is softened by chemical precipitation processes, usually utilizing calcium oxide or calcium hydroxide, followed by pH adjustment of the treated water with carbon dioxide or sodium carbonate in water treatment plants. The softening process results in water saturated with calcium carbonate and can lead to substantial hard carbonate deposits on the interior surfaces of the system. Blockage as thick as three inches in a 12-inch diameter pipe are not uncommon. The calcium carbonate precipitation process may also be utilized to remove iron, manganese, other heavy metals, radionuclides and some dissolved organics from various aqueous streams; all such processes can lead to substantial calcium carbonate deposits on the interior surfaces of the conduits. Substantial blockage leads to substantial flow reduction through the system and requires that the conduits be cleaned or replaced.

Industrial process pipes utilized in the transfer of basic materials such as ammonium hydroxide, sodium hydroxide, calcium hypochlorite and the like, can have substantial blockage due to the buildup of insoluble carbonates. These carbonate deposits are extremely hard, can result in the loss of 50% or more of the designed flow of the solutions through the system, and are very difficult to remove by the usual mechanical means such as hydroblasting, pigging or scraping. This is particularly true if there are valves, elbows or T-joints in the blocked system. Substantial carbonate buildup can be found in any type of pipe or component, including iron, steel, brass, copper, plastic, cement, clay, and the like.

Substantial carbonate blockage can also be found in geothermal and hot springs water conduit systems. Marine vacuum waste piping systems utilizing water for flushing can also accumulate substantial carbonate blockage which requires periodic maintenance cleaning. Substantial carbonate blockage has been found in sewer lines which have groundwater leakage into the carbon dioxide-rich atmosphere of the interior of the sewer. This has resulted in the growth of calcium carbonate stalactites up to 6 inches or more in length and also substantial carbonate blockage around the interior sewer joints.

In the past, mineral acids have generally been employed in an attempt to remove the carbonate blockage. A major safety problem results if a substantial amount of carbonate blockage needs to be removed because the acids will decompose the carbonate deposits, which usually consists of calcium carbonate and/or magnesium carbonate, to rapidly generate sizable volumes of carbon dioxide gas per weight of carbonate. For example, one mole of calcium carbonate (100.09 grams) will generate 22.4 liters of carbon dioxide gas at standard atmospheric conditions. Improper conventional acidic cleaning processes have been known to blow apart pipes and elbows being cleaned of carbonate blockage with explosive force. If too much acid is added to a system containing carbonate blockage, or if the system being cleaned cannot vent the carbon dioxide being formed in a controlled manner, a serious pressure buildup and a potentially explosive condition will most likely result.

U.S. Pat. No. 5,346,626 discloses using organic carboxylic acid polymers and sulfonic acid monomers to remove carbonate scale from heat transfer surfaces at a pH of 4–5. The polymers may be added all at once or in increments. The cleaning process begins at pH 3 and is complete when the solution is pH 5 or higher. The application of this method is directed toward boilers and cooling towers which have only a thin layer of carbonate-containing scale to be removed. U.S. Pat. No. 5,094,757 discloses a circulating acidic coolant solution of pH 4 to clean carbonate scale from vehicle cooling systems. After cleaning and refining, the cleaning coolant is adjusted to pH 9. U.S. Pat. No. 5,021,096 employs a two step process for removing iron oxide and hard water scale from heat exchanger surfaces by first treating with a circulating hydroxyacetic acid/polysaccharide gum solution followed by a circulating citric acid solution. Other art directed toward removal of thin layers of carbonate-containing scale from evaporative or heat exchanged surfaces with various acidic compositions is well known by one versed in that area of art.

The need exists, however, for a safe method to remove substantial amounts of hard carbonate deposits, in a controlled and timely manner, from water conduit systems that demonstrate substantial flow reduction due to carbonate deposits. Because the reaction of acids with carbonate blockage in water pipes to generate carbon dioxide gas is very rapid, the controlled addition of acid and the monitoring of carbon dioxide gas generated is essential to the safe removal of carbonate blockage. Otherwise, carbon dioxide gas pressure buildup or containment can result in potentially serious explosive conditions. Since carbon dioxide gas is heavier than air, it can also pose a hazard to workers removing the carbonate blockage. Carbon dioxide gas must therefore be monitored and controlled in the workplace to ensure a safe work area.

SUMMARY OF THE INVENTION

The present invention provides a safe method for the controlled removal of carbonate blockage in a water conduit system.

A section of pipe or other conduit that contains carbonate blockage is isolated, then the section is charged and circulated with water. The flow rate of the water through the section is measured to establish a baseline flow rate. A controlled amount of a carbonate-reactive acid is added to the section; this removes the blockage but generates carbon dioxide gas in the process. The fluid flow rate at the outlet of the section is monitored to detect production of carbon dioxide gas. The volume of gas produced is controlled by controlling the acid concentration and the water flow rate, thereby avoiding buildup of excessive or hazardous amounts of carbon dioxide gas.

In a preferred embodiment, the acid solution is circulated within the isolated section of the system. In another preferred embodiment, the spent acid solution is neutralized in-line. U.S. Pat. No. 5,360,488 and co-pending application Ser. No. 08/547,099, which are assigned to the assignee of this invention and are hereby incorporated by reference, disclose equipment which can be utilized to practice this invention for safe and efficient removal of carbonate deposits from water pipes. Controlled circulation or surging of the aqueous acidic solution through water systems, combined with controlled addition of the acid to the circulating water, will result in the complete removal of the carbonate blockage and avoid undesirable uncontrolled generation of carbon dioxide gas.

DETAILED DESCRIPTION OF THE INVENTION

Employing the circulation method of cleaning water pipes described in U.S. Pat. No. 5,360,488, or the circulation or surging methods employing the systems or equipment disclosed in the co-pending application Ser. Nos. 08/262,601 and 08/547,099, water is charged to the equipment employed and the isolated section to be cleaned and the circulation or surging is begun. The flow rates on the inlet and the outlet ends of the carbonate-blocked section to be cleaned are measured to establish a baseline flow rate and are then essentially equal. The acid employed to react with the carbonate blockage is then slowly added to the flowing water in the system, preferably to the reservoir tank, and the flow rate of the cleaning solution in and out of the section to be cleaned is monitored closely. As the acid concentration in the treating solution increases, the outlet fluid flow rate also increases because of the carbon dioxide gas generated. The rate of carbon dioxide generated is proportionate to the outlet flow rate and is carefully monitored to the acid flow rate. Care is taken to assure the rate of carbon dioxide generated is not excessive. A balance between the addition of acid and the generation of carbon dioxide is achieved for a safe cleaning operation. This usually occurs when the acidic cleaning solution is about pH 0 to 2, and preferably pH 0.5 to 1. When the outlet flow rate begins to drop, the cleaning of the carbonate blockage is nearing completion and the addition of acid is discontinued. When the outlet flow rate once again equals the inlet flow rate of the section, carbonate blockage removal is complete.

The resulting spent cleaning solution is neutralized in-line to about pH 7 with a base, such as alkali and alkaline earth metal hydroxides, carbonates, oxides, bicarbonates, ammonium hydroxide, and the like, and is then removed from the cleaned system. If hydrochloric acid is the acid used, the spent calcium chloride-containing solution may be used as a cement additive or to control ice, snow and dust on roadways or landfills.

When considerable amounts of carbonate deposits must be removed, considerable amounts of carbon dioxide gas are generated. Since carbon dioxide gas is heavier than air, extreme caution must be exercised so that workers will not be asphyxiated. It may be desirable to dilute the carbon dioxide gas generated with air by employing a mixing fan or mixing with compressed air or the like to dilute the carbon dioxide stream. A stack to disperse the carbon dioxide gas into the air could also be utilized.

Among the acids found to be useful in practicing the method of this invention are aqueous solutions of mineral acids such as hydrochloric, nitric, phosphoric, polyphosphoric, hydrofluoric, boric, sulfuric, sulfurous, and the like. Hydrochloric acid is sometimes preferred when removing calcium carbonate deposits. Such a process may result in a 20–25% calcium chloride side stream; this solution has commercial value for utilization as a cement additive in controlling ice and snow on highways and/or controlling dust on rural roads and landfills. Aqueous solutions of mono- di-, and polybasic organic acids have also been found to be useful and include formic, acetic, proprionic, citric, glycolic, lactic, tartaric, polyacrylic, benzoic, succinic, p-toluenesulfonic, and the like. Useful acidic cleaning solutions may also be aqueous mixtures of the various mineral and organic acids.

The acidic cleaning solution may also contain acid inhibitors, which substantially reduce the acidic action on metal surfaces of the water containment system being cleaned. These various acid inhibitors have been well documented in the prior art, and examples are disclosed in U.S. Pat. Nos. 2,758,970; 2,807,585; 2,941,949; 3,077,454; 3,607,781; 3,688,137; 3,885,913; 4,089,795; 4,199,469; 4,310,435; 4,541,945; 4,554,090; 4,587,030; 4,614,600; 4,637,899; 4,670,189; 4,780,150 and 4,851,149 which are incorporated herein by reference.

The acidic cleaning solution may also contain dispersing, penetrating or emulsifying agents to assist in the removal of the blockage. These surface active agents may be defined as anionic, cationic, nonionic or amphoteric as defined in the art. Compounds such as alkyl ether sulfates, alkyl or aryl sulfates, alkanolamines, ethoxylated alkanolamides, amine oxides, ammonium and alkali metal soaps, betaines, hydrotropes such as sodium aryl sulfonates, phosphate esters, quaternaries, sulfosuccinates, phosphate esters, and mixtures thereof, have been found to be useful in admixture with the acid cleaning solution in certain applications. Many other surfactants, as known to one knowledgeable in the art, could also be employed in the teachings of this invention.

The following examples illustrate various aspects of the invention.

EXAMPLE 1

Four hundred and thirty feet of 4-inch diameter carbon steel water header pipe used in a mining process and having about 900 pounds of calcium carbonate blockage built up on the interior walls of the system was cleaned using an open loop circulating system. The pump was operated at 1200 rpm and pressure of about 40 psi. The inlet and outlet flow rates with water alone were 55 gallons per minute. Muriatic acid (31% hydrochloric acid) was added slowly to the system reservoir with continued circulation. The outlet flow rate increased to about 120 gallons per minute and was maintained at that level by the continued addition of acid during the circulation. After continued cleaning the outlet flow rate began to drop and addition of acid was discontinued. When the outlet flow rate dropped to 55 gallons per minute, the cleaning of the carbonate blockage was complete. The spent acidic calcium carbonate cleaning solution was neutralized with 25% sodium hydroxide solution and removed from the cleaned system. Examination of the cleaned piping system confirmed the complete removal of the carbonate blockage.

EXAMPLE 2

Two hundred feet of 1½-inch PVC piping system transfer line for an ammonium hydroxide solution was cleaned of heavy thick calcium carbonate blockage with a 12.5% inhibited muriatic acid cleaning solution, employing an open loop circulating system. On start-up of the circulation, it was found that the piping system was essentially blocked. With the utilization of compressed air and reversal of the flow of the cleaning solution, the blockage was finally penetrated and flow of the cleaning solution begun. Additional muriatic acid was added to the cleaning solution to keep the pH between 0 and 0.4 with continued circulation and control of carbon dioxide evolution. After one hour the pipe was completely cleaned of carbonate blockage as noted by the cessation of carbon dioxide evolution and the equalization of the inflow and outflow rates from the cleaned process piping system.

EXAMPLE 3

Two hundred feet of a 1½-inch PVC piping system transfer line for a sodium hydroxide solution was cleaned of 3/16 inch blockage of hard calcium carbonate (about 265 pounds) from the inside of the pipe by employing an open loop circulating system with periodic addition of an inhibited muriatic acid to the circulating cleaning solution. Within four hours of circulation the inflow and outflow rates equalized, indicating complete removal of the blockage. Upon opening of a spool piece from the piping system, complete removal of the blockage was confirmed.

EXAMPLE 4

A 12-inch diameter iron piping system from part of a municipal water softening process plant had a 1½-inch thick hard calcium carbonate blockage on the interior surface of the pipe, along with severe blockages at elbows and low pipe levels in the piping system. Attempts at cleaning the system by hydroblasting had been unsuccessful. It was estimated that there was a minimum of 6,000 pounds of calcium carbonate blockage in the piping system which would produce about 150,000 gallons of carbon dioxide gas upon reaction with the acidic cleaning solution.

A mobile, open loop circulating system was fitted with an air dilution fan to dilute the evolved carbon dioxide gas effluent via the recirculation tank manhole. The equipment was also positioned downwind from the water treatment plant. Workers used carbon dioxide and oxygen detectors to insure safe atmospheric conditions in the area during the cleaning process.

Water was charged to the pipe section to be cleaned. Circulation was begun and an NSF International Standard 60 certified inhibited acid cleaning composition was added to the circulating water. Carbon dioxide gas evolution was controlled by controlled addition of the acidic cleaning composition and by monitoring the outlet fluid flow rate. The flow of cleaning solution through the blocked pipe was reversed periodically.

The cleaning process was continually monitored by monitoring the inlet and outlet fluid flow rates. When the inlet and outlet flow rates were once again equal, the treating solution was neutralized in situ with an NSF International Standard 60 certified sodium hydroxide solution and discharged to waste.

Removal of the blockage was verified by opening the cleaned pipe section and viewing the interior with a TV camera. Upon returning the system to service, the flow rate through the cleaned system had increased from about 650,000 gallons per hour to 2,250,000 gallons per hour, which was design capacity.

What is claimed is:

1. A method of controlled removal of carbonate blockage from a water conduit system, comprising:

isolating a section of said system having carbonate blockage deposited therein;

charging water into said section;

circulating said water through said section and measuring a flow rate of the water to establish a baseline flow rate;

adding a controlled amount of a carbonate-reactive acid to the water and pumping the acidified water to an inlet end of said section to remove said carbonate blockage with generation of carbon dioxide gas;

monitoring a fluid flow rate at the inlet and an outlet end of said section to detect said generation of said carbon dioxide gas; and controlling said fluid flow rate to control said carbon dioxide gas generation in said section.

2. The method of claim 1 wherein said acid is selected from the group consisting of a mineral acid, an organic acid, and a mixture of a mineral acid and an organic acid.

3. The method of claim 1 wherein said acidified water contains acid inhibitors.

4. The method of claim 1 wherein said acidified water contains surfactants selected from the group consisting of dispersing, penetrating, and emulsifying agents.

5. The method of claim 1 wherein said acidified water is charged from a reservoir tank.

6. The method of claim 1 wherein said acidified water has a pH in the range of approximately 0–2.

7. The method of claim 1 wherein said acidified water is neutralized in said section with a base in solution and then discharged from said section.

8. The method of claim 7 wherein said base is selected from the group consisting of alkali and alkaline earth metal hydroxides, carbonates, oxides, bicarbonates, and ammonium hydroxide.

9. The method of claim 1 wherein said acidified water is circulated through said system.

10. The method of claim 1 wherein said acidified water is surged through said system.

11. The method of claim 1 wherein said system is a potable water system.

12. The method of claim 11 wherein said acid composition meets NSF International Standard 60 requirements.

13. The method of claim 12 wherein a base composition to neutralize said acid composition meets NSF International Standard 60 requirements.

14. A method of controlled removal of carbonate blockage from a water conduit system, comprising the steps of:

isolating a section of said system having carbonate blockage deposited therein;

charging water into said section;

circulating said water through said section and measuring a flow rate of the water to establish a baseline flow rate;

adding a controlled amount of a carbonate-reactive acid to the water and pumping the acidified water to an inlet end of said section to remove said carbonate blockage with generation of carbon dioxide gas;

monitoring a fluid flow rate at the inlet and an outlet end of said section to monitor said carbon dioxide gas generation;

adjusting said carbonate-reactive acid concentration and flow rate to control said carbon dioxide gas generation;

circulating said carbonate-reactive acid through said section until said outlet fluid flow rate returns to baseline levels; and neutralizing said carbonate-reactive acid in said section upon treatment completion.

* * * * *